United States Patent
Gailey et al.

(10) Patent No.: US 7,412,260 B2
(45) Date of Patent: Aug. 12, 2008

(54) ROUTING CALL FAILURES IN A LOCATION-BASED SERVICES SYSTEM

(75) Inventors: Michael L. Gailey, Dunwoody, GA (US); Eric A. Portman, Norcross, GA (US); Chad S. Holmes, Atlanta, GA (US); Michael J. Burgiss, Smyrna, GA (US); Angela King Smith, Atlanta, GA (US)

(73) Assignee: Accenture LLP, San Jose, CA (US)

( * ) Notice: Subject to any disclaimer, the term of this patent is extended or adjusted under 35 U.S.C. 154(b) by 413 days.

(21) Appl. No.: 10/133,118

(22) Filed: Apr. 26, 2002

(65) Prior Publication Data

US 2002/0160772 A1 Oct. 31, 2002
US 2005/0221812 A9 Oct. 6, 2005

Related U.S. Application Data

(63) Continuation-in-part of application No. 09/946,111, filed on Sep. 4, 2001, now Pat. No. 6,994,447.

(60) Provisional application No. 60/286,916, filed on Apr. 27, 2001.

(51) Int. Cl.
*H04B 1/38* (2006.01)

(52) U.S. Cl. .............. 455/563; 455/414.2; 455/456.3; 379/88.01; 704/251; 704/257

(58) Field of Classification Search .............. 379/88.01, 379/88.02; 455/404.1, 404.2, 414.1, 414.2, 455/414.3, 414.4, 417, 428, 456.1–457, 563, 455/566; 704/235, 251, 257

See application file for complete search history.

(56) References Cited

U.S. PATENT DOCUMENTS 4,586,160 A  4/1986  Amano et al. .............. 364/900
4,791,281 A  12/1988  Johnsen et al. .............. 235/383

(Continued)

FOREIGN PATENT DOCUMENTS

EP  0 837 406 A2  4/1998

(Continued)

OTHER PUBLICATIONS

"The Risks Digest," ACM Committee on Computers and Public Policy, Peter G. Neumann, moderator, vol. 21, Issue 5, Sep. 2000, http://catless.ncl.ac.uk/Risks/21.05.html.

(Continued)

*Primary Examiner*—Duc Nguyen
*Assistant Examiner*—Anthony S Addy
(74) *Attorney, Agent, or Firm*—Brinks Hofer Gilson & Lione

(57) ABSTRACT

A method and system for routing call failures in a location-based services system. A remote terminal is connected to a location-based services system and is used to generate a voice-based tailored request for information. The voice-based tailored request for information is interpreted with a voice recognition application and a natural language processing application. If the voice recognition application or the natural language processing application fail to determine the meaning of the tailored request for information to a predetermined level of accuracy then the remote terminal is routed to a call center.

31 Claims, 4 Drawing Sheets

U.S. PATENT DOCUMENTS

| | | | | |
|---|---|---|---|---|
| 5,343,493 | A * | 8/1994 | Karimullah | 375/130 |
| 5,559,707 | A | 9/1996 | DeLorme et al. | 364/443 |
| 5,625,668 | A | 4/1997 | Loomis et al. | |
| 5,682,525 | A | 10/1997 | Bouve et al. | 395/615 |
| 5,717,923 | A | 2/1998 | Dedrick | |
| 5,764,731 | A | 6/1998 | Yablon | 379/216 |
| 5,774,860 | A | 6/1998 | Bayya et al. | 704/275 |
| 5,794,204 | A | 8/1998 | Miyazawa et al. | 704/275 |
| 5,794,235 | A | 8/1998 | Chess | 707/5 |
| 5,804,803 | A | 9/1998 | Cragun et al. | 235/375 |
| 5,809,471 | A | 9/1998 | Brodsky | 704/275 |
| 5,860,063 | A | 1/1999 | Gorin et al. | 704/257 |
| 5,905,246 | A | 5/1999 | Fajkowski | 235/375 |
| 5,924,070 | A | 7/1999 | Ittycheriah et al. | 704/275 |
| 5,963,940 | A | 10/1999 | Liddy et al. | 707/5 |
| 6,049,711 | A * | 4/2000 | Ben-Yehezkel et al. | 455/414 |
| 6,073,112 | A | 6/2000 | Geerlings | 705/14 |
| 6,076,099 | A | 6/2000 | Chen et al. | |
| 6,091,956 | A | 7/2000 | Hollenberg | |
| 6,112,174 | A | 8/2000 | Wakisaka et al. | 704/251 |
| 6,125,342 | A | 9/2000 | Selesky | 704/9 |
| 6,181,927 | B1 | 1/2001 | Welling, Jr. et al. | 455/414 |
| 6,185,535 | B1 | 2/2001 | Hedin et al. | 704/270 |
| 6,195,641 | B1 | 2/2001 | Loring et al. | 704/275 |
| 6,199,099 | B1 | 3/2001 | Gershman et al. | |
| 6,202,023 | B1 | 3/2001 | Hancock et al. | 701/201 |
| 6,219,696 | B1 | 4/2001 | Wynblatt et al. | 709/218 |
| 6,233,559 | B1 | 5/2001 | Balakrishnan | 704/275 |
| 6,236,977 | B1 | 5/2001 | Verba et al. | 705/10 |
| 6,243,684 | B1 * | 6/2001 | Stuart et al. | 704/275 |
| 6,246,672 | B1 | 6/2001 | Lumelsky | 370/310 |
| 6,250,557 | B1 | 6/2001 | Forslund et al. | 235/492 |
| 6,301,480 | B1 * | 10/2001 | Kennedy | 455/445 |
| 6,301,560 | B1 | 10/2001 | Masters | 704/251 |
| 6,308,151 | B1 | 10/2001 | Smith | 704/235 |
| 6,317,718 | B1 | 11/2001 | Fano | |
| 6,336,098 | B1 | 1/2002 | Fortenberry et al. | 705/14 |
| 6,360,167 | B1 | 3/2002 | Millington et al. | 701/211 |
| 6,370,514 | B1 | 4/2002 | Messner | |
| 6,408,307 | B1 | 6/2002 | Semple et al. | 707/104.1 |
| 6,418,199 | B1 | 7/2002 | Perrone | 379/88.01 |
| 6,418,216 | B1 | 7/2002 | Harrison et al. | 379/208.01 |
| 6,424,945 | B1 | 7/2002 | Sorsa | 704/270.1 |
| 6,427,115 | B1 | 7/2002 | Sekiyama | 701/208 |
| 6,434,524 | B1 | 8/2002 | Weber | 704/257 |
| 6,434,526 | B1 | 8/2002 | Cilurzo et al. | 704/270.1 |
| 6,452,498 | B2 | 9/2002 | Stewart | 340/573.1 |
| 6,460,036 | B1 | 10/2002 | Herz | 707/10 |
| 6,466,796 | B1 * | 10/2002 | Jacobson et al. | 455/456.3 |
| 6,466,899 | B1 | 10/2002 | Yano et al. | 704/1 |
| 6,493,671 | B1 | 12/2002 | Ladd et al. | 704/270 |
| 6,501,833 | B2 | 12/2002 | Phillips et al. | 379/88.07 |
| 6,502,076 | B1 | 12/2002 | Smith | 705/14 |
| 6,510,417 | B1 | 1/2003 | Woods et al. | 704/275 |
| 6,513,052 | B1 | 1/2003 | Binder | 707/204 |
| 6,535,743 | B1 * | 3/2003 | Kennedy et al. | 455/456.1 |
| 6,535,854 | B2 | 3/2003 | Buchner et al. | 704/275 |
| 6,560,456 | B1 | 5/2003 | Lohtia et al. | 455/445 |
| 6,606,745 | B2 | 8/2003 | Maggio | 725/23 |
| 6,614,885 | B2 * | 9/2003 | Polcyn | 379/88.02 |
| 6,647,257 | B2 | 11/2003 | Owensby | 455/414.1 |
| 6,757,544 | B2 * | 6/2004 | Rangarajan et al. | 455/456.1 |
| 6,760,426 | B2 * | 7/2004 | Sbisa et al. | 379/221.09 |
| 6,792,096 | B2 * | 9/2004 | Martin et al. | 379/218.01 |
| 6,834,195 | B2 | 12/2004 | Brandenberg et al. | |
| 6,848,542 | B2 | 2/2005 | Gailey et al. | 186/35 |
| 6,850,766 | B2 * | 2/2005 | Lau et al. | 455/456.1 |
| 6,859,777 | B2 | 2/2005 | Krasle | 704/270.1 |
| 6,898,571 | B1 | 5/2005 | Val et al. | |
| 6,901,366 | B1 | 5/2005 | Kuhn et al. | 704/275 |
| 6,907,119 | B2 * | 6/2005 | Case et al. | 379/218.01 |
| 6,937,986 | B2 | 8/2005 | Denenberg et al. | 704/275 |
| 6,937,995 | B1 | 8/2005 | Kepecs | 705/14 |
| 6,944,447 | B2 | 9/2005 | Portman et al. | 455/422.1 |
| 6,961,706 | B2 | 11/2005 | Saito | 704/275 |
| 6,970,830 | B1 | 11/2005 | Samra et al. | 705/10 |
| 6,996,531 | B2 * | 2/2006 | Korall et al. | 704/270 |
| 7,006,983 | B1 | 2/2006 | Packes, Jr. et al. | 705/14 |
| 7,020,609 | B2 | 3/2006 | Thrift et al. | 704/270.1 |
| 7,028,072 | B1 | 4/2006 | Kliger et al. | 709/203 |
| 7,050,977 | B1 * | 5/2006 | Bennett | 704/270.1 |
| 7,130,630 | B1 * | 10/2006 | Enzmann et al. | 455/435.1 |
| 7,233,655 | B2 | 6/2007 | Gailey et al. | 379/210.01 |
| 7,254,384 | B2 | 8/2007 | Gailey et al. | 455/412 |
| 2001/0044309 | A1 | 11/2001 | Bar et al. | |
| 2002/0004745 | A1 | 1/2002 | Bascobert et al. | 705/14 |
| 2002/0029172 | A1 * | 3/2002 | I'Anson et al. | 705/26 |
| 2002/0035568 | A1 | 3/2002 | Benthin et al. | 707/102 |
| 2002/0036654 | A1 | 3/2002 | Evans et al. | 345/744 |
| 2002/0040297 | A1 * | 4/2002 | Tsiao et al. | 704/257 |
| 2002/0046084 | A1 | 4/2002 | Steele et al. | 705/14 |
| 2002/0090934 | A1 | 7/2002 | Mitchelmore | |
| 2002/0133477 | A1 | 9/2002 | Abel | 701/1 |
| 2002/0143550 | A1 | 10/2002 | Nakatsuyama | 704/270.1 |
| 2002/0161625 | A1 | 10/2002 | Brito-Valladares et al. | 705/10 |
| 2002/0161647 | A1 | 10/2002 | Gailey et al. | 705/14 |
| 2002/0166127 | A1 | 11/2002 | Hamano et al. | 725/105 |
| 2003/0041050 | A1 | 2/2003 | Smith et al. | 707/1 |
| 2003/0065620 | A1 | 4/2003 | Gailey et al. | 705/51 |
| 2003/0065749 | A1 | 4/2003 | Gailey et al. | 709/219 |
| 2003/0135853 | A1 | 7/2003 | Goldman et al. | 725/34 |
| 2003/0154126 | A1 | 8/2003 | Gehlot et al. | 705/14 |
| 2003/0182131 | A1 | 9/2003 | Arnold et al. | 704/275 |
| 2004/0166832 | A1 | 8/2004 | Portman et al. | 455/412.1 |
| 2004/0243417 | A9 | 12/2004 | Pitts, III et al. | 704/276 |
| 2005/0027590 | A9 | 2/2005 | Gailey et al. | 705/14 |
| 2005/0027591 | A9 | 2/2005 | Gailey et al. | 705/14 |
| 2005/0102180 | A1 | 5/2005 | Gailey et al. | 705/14 |

FOREIGN PATENT DOCUMENTS

| | | |
|---|---|---|
| JP | 11-069404 | 3/1999 |
| JP | 2000-067047 | 3/2000 |
| JP | 2000-268042 | 9/2000 |
| JP | 2001-004387 | 1/2001 |
| JP | 2001-043479 | 2/2001 |
| JP | 2001-057593 | 2/2001 |
| JP | 2001-101000 | 4/2001 |
| JP | 2001-516905 | 10/2001 |
| JP | 2002-536755 | 10/2002 |
| KR | 1999-0082755 | 11/1999 |
| WO | WO 97/50002 | 12/1997 |
| WO | WO 98/49641 A1 | 11/1998 |
| WO | WO 99/14743 | 3/1999 |
| WO | WO 99/62013 A1 | 12/1999 |
| WO | WO 00/21232 | 4/2000 |
| WO | WO 00/29982 | 5/2000 |
| WO | WO 00/46792 | 8/2000 |

OTHER PUBLICATIONS

Akiyama, T., Niwa, M., Watanabe, M., Tomikashi, M., Konishi, T., Itoh, Y., "Constructing a Natural Language Interface of Car Navigation Systems," Collection of Reports Produced to the Information Processing Academy, vol. 99, No. ITS-2, pp. 53-60, published by the Information Processing Academy on Jun. 3, 1999; (Translation - Abstract only).

* cited by examiner

ROUTING CALL FAILURES IN A LOCATION-BASED SERVICES SYSTEM

This application is a continuation-in-part of U.S. application Ser. No. 09/946,111, filed Sep. 4, 2001, now U.S. Pat. No. 6,994,447, issued Sep. 13, 2005. This application claims the benefit of the filing date under 35U.S.C. §119(e) of U.S. Provisional Application Serial No. 60/286,916, filed Apr. 27, 2001. In addition, the following commonly owned patents and patent applications are related to this application: U.S. patent application Ser. No. 10/131,898, filed Apr. 25, 2002, entitled NATURAL LANGUAGE PROCESSING FOR A LOCATION-BASED SERVICES SYSTEM; U.S. patent application Ser. No. 10/133,536, filed Apr. 26, 2002, entitled ADVERTISING CAMPAIGN BUSINESS LISTING MANAGEMENT FOR A LOCATION-BASED SERVICES SYSTEM; U.S. Pat. No. 6,848,542 B2, issued Feb. 1, 2005, entitled METHOD FOR PASSIVE MINING OF USAGE INFORMATION IN A LOCATION-BASED SERVICES SYSTEM; U.S. patent application Ser. No. 10/134,405, entitled TRACKING PURCHASES IN A LOCATION-BASED SERVICES SYSTEM; U.S. patent application Ser. No. 11/007,761, filed Dec. 8, 2004, entitled PASSIVE MINING OF USAGE INFORMATION IN A LOCATION-BASED SERVICES SYSTEM; and U.S. Pat. No. 6,944,447, issued Sep. 13, 2005, entitled LOCATION-BASED SERVICES.

FIELD OF THE INVENTION

The present invention relates generally to location-based services and more particularly, to routing a call to a human operator when a mechanized voice recognition system fails to successfully handle a consumer request.

BACKGROUND OF THE INVENTION

Wireless communication devices have recently evolved from a technology used by an elite segment of the population to a technology that is used by the masses. In the year 2000, it has been estimated that well over 100 million people in the United States alone subscribed to at least one type of wireless communication service. Worldwide, the number of wireless communication device users has reached a staggering number and is growing all of the time. In the near future, it is envisioned that almost everyone will own or use some sort of wireless communication device that is capable of performing a variety of functions.

In addition to traditional wireless communication devices, many different types of portable electronic devices are in use today. In particular, notebook computers, palm-top computers, and personal digital assistants (PDA) are commonplace. The use of wireless communication devices is widespread and it is expected that in the near future combined mobile telephone/PDA devices will be widely used by the masses. Currently, most of these devices are only used by a small segment of the population due, in large part, to the fact that there are a limited number of applications and services available for such devices.

The Internet has become a widely used medium for providing business information in a variety of forms that are targeted to various types of individuals and businesses. Generally speaking, one of the problems associated with searching for business information on specific products and services using the Internet is being able to locate relevant business information for products and services that are available in a geographic area that is located near the user. As such, a need exists for a way to provide a broad range of business information and content to wireless communication devices and workstations that are based on the respective geographic location of the communication device at the time the information is requested.

Users of several different types of remote terminals often desire to use directory assistance services that are provided by various telephone companies. Many of these directory assistance calls originate in a respective metropolitan telephone service area and request listing information for listings contained in the same metropolitan service area. Most local directory assistance services in use today are handled by an operator that assists the requestor by manually inputting the requested information into an application that searches a database containing residential and business listings. As such, a need exists for providing an enhanced directory assistance system that is capable of automatically providing geographically targeted responses to requestors.

When consumers request information on a respective product or service using voice commands there is a chance that the system will not recognize the words that have been spoken and thus a voice enable system cannot locate the appropriate information. Often times this is frustrating to users who in turn, may eventually stop using voice enable systems if they experience errors. As such, a need exists for routing call failures in a location-based services system.

SUMMARY OF THE PRESENT INVENTION

The present invention discloses a method and system for routing call failures in a location-based services system. In the preferred embodiment, a remote terminal is connected to the location-based services system using one of several different access methods. A voice-based tailored request for information is then generated by a user of the remote terminal and transmitted to the location-based services system. The voice-based tailored request for information is then interpreted with a voice recognition application. If the voice recognition application fails to interpret the voice-based tailored request for information to a predetermined level of accuracy, the remote terminal connection is routed to a call center server.

The call center server is preferentially operable to forward the connection to the remote terminal to an available operator. The operator can then assist the user of the remote terminal by entering a request for information from the user into a location-based application server that is designed to generate responses to user requests. The structured response is then transmitted to the remote terminal by the location-based services system. In the present preferred embodiment, the structured response is transmitted to a voice synthesis server that is capable of creating a voice response that is sent to the remote terminal.

Yet another preferred embodiment of the present invention discloses a method and system for routing call failures in a location-based services system. In this embodiment, a remote terminal is connected to a location-based services system. A voice-based tailored request for information is generated by a user of the remote terminal that is transmitted to the location-based services system 10. The voice-based tailored request for information is then interpreted with a voice recognition application and the interpretation of the voice-based tailored request for information is transmitted from the voice recognition application to a natural language processing application. If the natural language processing application fails to interpret the intent of the voice-based tailored request for information to a predetermined level of accuracy then the remote terminal is routed or connected to a call center server.

Further objects and advantages of the present invention will be apparent from the following description, reference being made to the accompanying drawings wherein preferred embodiments of the invention are clearly illustrated.

DETAILED DESCRIPTION OF THE PRESENTLY PREFERRED EMBODIMENTS OF THE INVENTION

Figure 1:
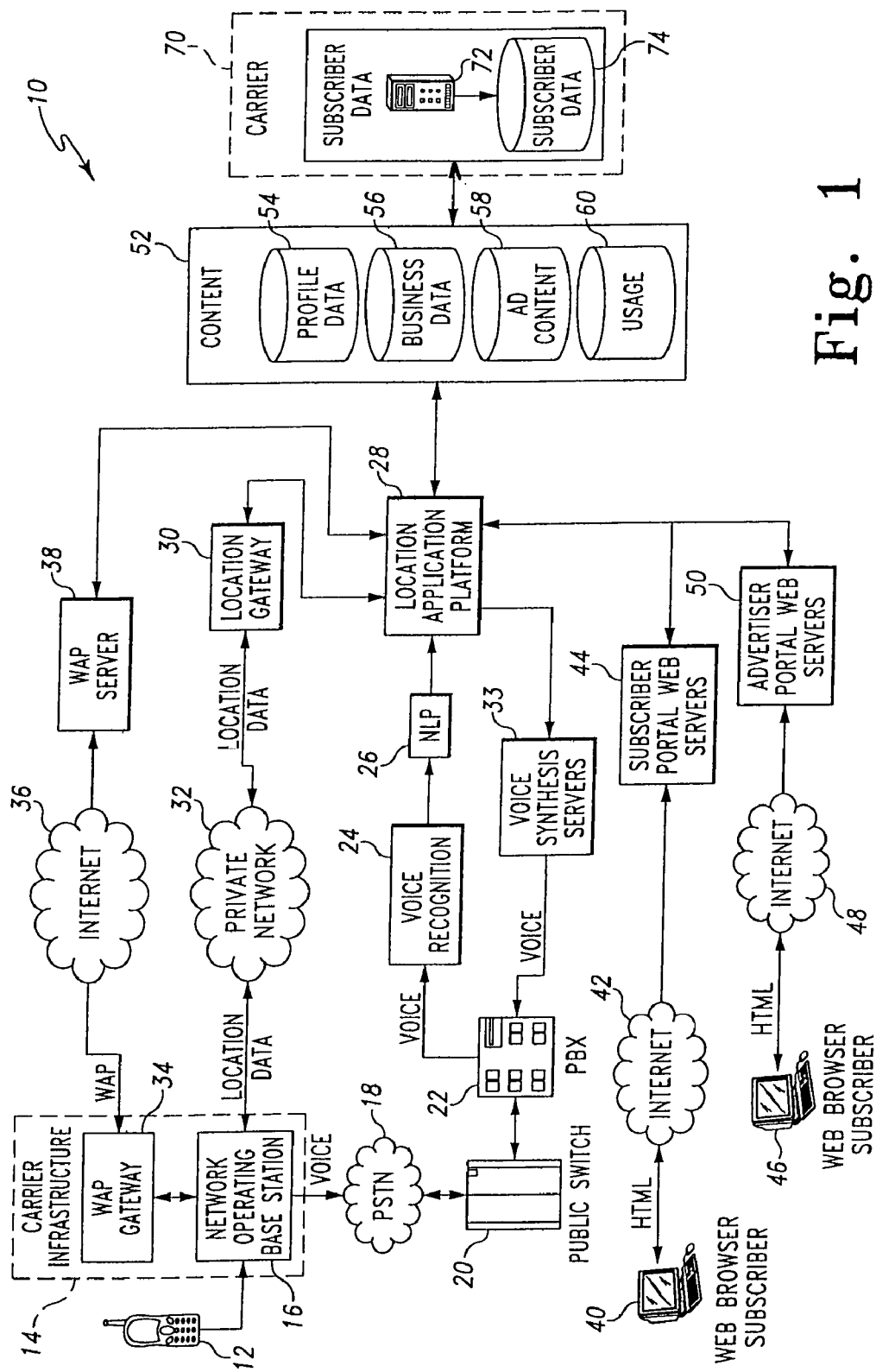
FIG. 1 illustrates a preferred embodiment of the location-based services system.

The present invention discloses a method and system for delivering location-based services through a variety of communication networks. Referring to FIG. 1, the preferred location-based services system 10 uses the geographic location of a remote terminal 12 to provide geographically targeted services to the remote terminal 12. Remote terminals 12 that subscribe to the location-based services system 10 are capable of selecting and receiving information from a broad range of business and service providers that are located in a geographic region that is close to the remote terminal 12 and, thus, the user.

As illustrated in FIG. 1, one preferred embodiment of the location-based services system 10 includes a remote terminal 12 that is connected to a wireless communication system 14 using one of several available and commonly used communication protocols. As illustrated, the remote terminal 12 is connected to a base station 16 of the wireless communication system 14, which transmits and receives radio signals to the remote terminal 12 during operation. Those skilled in the art would recognize that although only one base station 16 is illustrated in FIG. 1, several base stations 16 are actually used to make-up the preferred wireless communication system 14. Ideally, the preferred wireless communication system 14 would cover a wide geographic region, such as, by way of example only, the entire United States.

In the preferred embodiment of the present invention, the remote terminal 12 is capable of sending a digital input signal to the base station 16. The term digital input signal should be broadly construed to include voice signals, keypad input data, and pointer device selections or data from any other commonly used means for inputting data into a respective remote terminal 12. Those skilled in the art would recognize that several peripheral devices are available for various types of remote terminals 12 that could be used to input data into the remote terminals 12 and may be taken advantage of by the present invention.

Preferentially, the wireless communication system 14 is a digital communication system that uses one of several different methods of providing wireless digital communication between the remote terminals 12 and the base stations 16. The wireless communication system 14 can use frequency division duplexing (FDD) or time division duplexing (TDD) to allocate for the two directions of transmission between the remote terminal 12 and the base station 16.

In order to provide multiple access methods to the remote terminals 12, which refers to the method of creating multiple channels for each transmission direction, one of several different types of multiple access methods may be used in the present invention. Three preferred types of multiple access methods that might be used include: frequency division multiple access (FDMA); time division multiple access (TDMA); and/or code division multiple access (CDMA). Those skilled in the art would recognize that the present invention could readily be adapted to take advantage of other multiple access methods as well.

As further illustrated in FIG. 1, in the preferred embodiment of the present invention the base station 16 of the wireless communication system 14 is connected to a public switched telephone network (PSTN) 18 by a public switch 20. As known to those skilled in the art, the PSTN 18 is a worldwide voice telephone network that is used to allow various communication devices to communicate with each other. Although the preferred PSTN 18 is a digital system, the present invention may be adapted for use on analog systems as well to accommodate geographic regions that might be underdeveloped or not serviced by a digital system.

The public switch 20 transfers the signals that are received from the base station 16 to a private branch exchange (PBX) 22. The public switch 20 is connected to the private branch exchange (PBX) 22, which, as generally known in the art, is a telephone switching system that is used to interconnect various telephone extensions to each other. In the preferred embodiment of the present invention, the PBX 22 uses all-digital methods for switching and is capable of supporting digital remote terminals and telephones and analog remote terminals and telephones. As set forth in greater detail below, in the preferred embodiment, the PBX 22 is connected to a server of the location-based services system 10, which is a form of a digital remote terminal.

Referring to FIG. 1, in this embodiment of the present invention, the PBX 22 is connected to at least one voice recognition server 24. The voice recognition server 24 contains at least one voice recognition application that is operable to recognize the respective words that are contained in the voice signals that are received from the PBX 22. As set forth in greater detail below, a resulting output is generated by the voice recognition application that is used by a natural language processing application.

The voice recognition server 24 is connected to at least one natural language processing server 26 that includes at least one natural language processing application that processes the identified words contained in the voice signals to ascertain the meaning of the words that are contained in the voice signals. As such, during operation, the voice recognition server 24 identifies or recognizes the particular words that are contained in the voice signals and the natural language processing server 26 interprets the meaning of the recognized words of the voice signals that are originally generated from the remote terminal 12. The natural language processing application may be located on the voice recognition server 24 in other embodiments of the present invention, but, in an effort to increase the level of performance, would preferentially be located on a separate server or a separate set of servers.

The natural language processing server 26 is connected to at least one location-based application server 28. As set forth in detail below, the location-based application server 28 is programmed to provide responsive information to the remote terminals 12 that has been requested by a respective user of the remote terminal 12. Generally speaking, the location-based application server 28 is used to retrieve and pass on location-based information to the remote terminals 12 in various data formats. The type of information provided to the remote terminals 12 varies depending on the specific nature of the information that has been requested from the user and the geographic location of the remote terminal 12.

During operation, after the meaning of the words in the voice signals are interpreted, the natural language processing server 26 is programmed to create a structured request that is sent to the location-based application server 28. In response to the structured request, the location-based application server 28 generates a structured response that is sent to the remote terminal 12. As set forth in greater detail below, the exact nature of the information sent in the structured response depends on the specific request that is made by a particular user of the remote terminal 12.

If an analog voice signal is used, although not illustrated in FIG. 1, at least one digital signal processor server could be used to convert the analog signal into a digital signal that the voice recognition server 24 can process and interpret using the voice recognition applications. In this respective embodiment, the digital signal processor server is preferentially connected between the voice recognition server 24 and the PBX 22. Those skilled in the art would recognize that the voice recognition server 24 might also be designed to perform the functions of the digital signal processor server in other embodiments of the present invention.

Each remote terminal 12 also sends a unique remote terminal identifier to the base station 16 while communicating with the base station 16 of the wireless communication system 14. The remote terminal identifier is preferentially attached to each voice signal as it passes through the location-based services system 10 so that the system can keep track of which respective remote terminal 12 is supposed to receive the information that has been requested. Those skilled in the art would recognize that various identification methods might be used to keep track of specific remote terminals 12 using the location-based services system 10.

As further illustrated in FIG. 1, the location-based application server 28 is also connected to a location gateway server 30, which is, in turn, connected to the base station 16 of the wireless communication system 14. The location gateway server 30 is used by the location-based application server 28 to retrieve a geographic indicator that is associated with each respective remote terminal 12. As such, while a respective remote terminal 12 is connected to the wireless communication system 14, the location-based application server 28 is capable of determining the respective geographic location of the remote terminal 12 so that geographically targeted responses and information can be provided to the remote terminal 12.

As illustrated in FIG. 1, the location gateway server 30 is preferentially connected to the base station 16 of the wireless communication system 14 using a network connection 32, which may be a private network connection or an Internet connection in alternative embodiments of the present invention. The geographic indicator may be generated by the remote terminal 12 or the base station 16 and is preferentially transmitted to the location-based application server 28 when a user of the remote terminal 12 is accessing the location-based services system 10. The geographic indicator is preferentially transmitted to the location-based application server 28 with the remote terminal identifier so that the location-based application server 28 can associate each respective remote terminal 12 with a particular geographic location.

In the preferred embodiment of the present invention, the geographic indicator may be preset by a user of the remote terminal 12, automatically generated by a GPS located in the remote terminal 12 or generated by a specialized geographic determination application running on the base station 16. In addition, the present invention may advantageously take advantage of an enhanced 911 system of the wireless communication system 14 to generate the geographic indicator. In another embodiment of this invention, the geographic indicator may originate from a combination of these sources and/or systems (i.e. it could come from a GPS-assisted network that uses GPS and devices on the network). The geographic indicator may automatically be sent to the location-based application server 28 as soon as a respective remote terminal 12 connects to the wireless communication system 14; however, in alternative embodiments of the present invention, the geographic indicator is only sent when a respective remote terminal is sending a structured request to the location-based application server 28. As the geographic location of the remote terminal 12 changes, the geographic indicator is updated and the updated information can continuously be sent to the location-based application server 28.

As further illustrated in FIG. 1, at least one voice synthesis server 33 is connected to the location-based application server 28 and the PBX 22. For voice-related applications of the location-based services system 10, the voice synthesis server 33 is used to generate voice responses that are based on the structured responses that are generated in response to the structure requests that are received by the location-based application server 28. Voice synthesis applications on the voice synthesis server 33 are used to transform the structured responses into voice response. In the preferred embodiment, the PBX 22 is used to transmit the voice responses to the PSTN 18, which, in turn, transmits the voice response to the base station 16, which ultimately transmits the voice response on to the remote terminal 12. In alternative embodiments of the present invention, the voice synthesis server 33 may be connected directly to respective base stations 16 of the wireless communication system 14.

Referring once again to FIG. 1, in yet another preferred embodiment of the present invention, the remote terminal 12 is connected to the location-based application server 28 through a wireless application protocol (WAP) gateway 34 of the wireless communication system 14. The WAP gateway 34 is connected to a WAP server 38 of the location-based services system 10 through a network connection 36. The network connection 36 may be a private network connection or an Internet connection. The WAP server 38 is connected to the location-based application server 28 and, during operation, is used to generate structured requests, which are based on requests that are input to the remote terminal 12 and sent to the location-based application server 28.

The remote terminal 12 is capable of communicating with the WAP server 38 and the location-based application server 28 using a WAP standard. As known to those skilled in the art, the WAP standard is a protocol that is designed for wireless communication devices to provide secure access to e-mail and text-based web pages. WAP provides a complete environment for wireless applications that includes a wireless counterpart of TCP/IP and a framework for telephony integration. In the preferred embodiment of the location-based services system 10, the remote terminals 12 may also be capable of browsing for location-based services through the use of text and graphical based menus that can be provided to the remote terminals 12 from the location-based application server 28.

One preferred embodiment of the present invention uses the WAP standard to support the use of a Wireless Markup Language (WML), which is a streamlined version of HTML for small screen displays, to conduct communication and transfer information between the remote terminal 12 and the location-based application server 28. WAP is also capable of using WMLScript, which is a compact JavaScript-like language that is capable of running in limited memory on the remote terminal 12. The location-based services system 10 can also be designed to advantageously take advantage of this capability to provide location-based services to users of remote terminals 12 depending the particular geographic location of the remote terminal 12.

In this preferred embodiment of the present invention, the WAP standard supports various handheld input methods such as keypad inputs or pointer device inputs that may be generated on various different types of remote terminals 12. As it relates to the present invention, this gives users of the remote terminals 12 the capability of inputting data from keypads for the purposes of entering search requests to the location-based services system 10. In addition, the remote terminals 12 are capable of receiving, interpreting and displaying web pages that include hypertext links to other web pages that may be selected using various selection methods.

For the purpose of the present invention, the term wireless application protocol should be broadly construed to include any communication protocol similar to what is commonly referred to as the "WAP standard," which, as set forth above, is used to transmit text and graphics-based information to remote terminals 12. Although the WAP standard is used in this particular preferred embodiment of the present invention, those skilled in the art should recognize that other text and graphics-based communication protocols could be used in alternative embodiments of the present invention.

For example, although not specifically illustrated, another preferred embodiment of the present invention could be designed for an i-Mode wireless communication system. i-Mode wireless communication systems use a packet-based communication protocol to communicate between the remote terminals 12 and the base station 16, which essentially means that the remote terminals 12 are connected to the wireless communication system at all times and communicate with the base stations 16 using packets. i-Mode is also capable of providing web-browsing and customized applications to remote terminals 12.

i-Mode is a proprietary system that uses a subset of HTML, known as cHTML, in contrast to the WAP standard, which uses WML. In this particular embodiment, an i-Mode server is used to connect the base station 16 of the wireless communication system 14 to the location-based application server 28. The remaining details of this particular embodiment are similar to other embodiments of the present invention and, as such, a more detailed discussion is not necessary.

Referring to FIG. 1, in yet another preferred embodiment of the location-based services system 10, a second remote terminal 40 is connected to a subscriber portal web server 44 through a network connection 42. The network connection 42 may be a private network connection or an Internet connection. As illustrated, the subscriber portal web server 44 is also connected to the location-based application server 28. During operation, the second remote terminal 40 is programmed to receive structured requests that are sent to the location-based application server 28 and, likewise, the location-based application server 28 is programmed to generate structured responses that are sent to the second remote terminal 40.

The second remote terminal 40 and the location-based application server 28 preferentially communicate with each other using standard web-based protocols that are commonly used in various Internet-based applications. In this embodiment of the present invention, a user accesses the subscriber portal web server 44 through the second remote terminal 40, which is preferentially a computer workstation. As a subscriber to the location-based services system 10, the second remote terminal 40 is assigned a predetermined geographic indicator. The geographic indicator is used by the location-based application server 28 to target services and business content to the second remote terminal 40 that are based on the geographic location of the second remote terminal 40.

The user of the second remote terminal 40 may be given the option of setting the geographic indicator to a desired geographic location, which may or may not be the exact geographic location of the second remote terminal 40. For example, if the user is traveling to another city that evening and wants to access location-based services in that particular city, an option can be provided allowing the second remote terminal 40 to designate that particular city.

In this preferred embodiment of the present invention, the second remote terminal 40 is preferentially a computer workstation that includes multimedia capabilities and includes a microphone and a sound card. As known to those skilled in the art, this allows the second remote terminal 40 to generate sound through a speaker system and receive voice signals through the microphone. Although not specifically illustrated in FIG. 1, this could allow the subscriber portal web server 44 to be connected to the voice recognition server 24 so that voice signals sent from the second remote terminal 40 could be processed similar to the method used to process voice signals received from wireless remote terminal 12.

Referring to FIG. 1, a business remote terminal 46 is connected to a network connection 48 that is connected to an advertiser portal web server 50. The network connection 48 may be a private network connection or an Internet connection. The advertiser portal web server 50 allows various businesses (i.e., content providers) to add, modify and/or delete campaigns that are designed to promote and sell various products and services through the location-based services system 10. For example, if a particular business entity desires to run a promotion on a particular product or service, the advertiser portal web server 50 allows the business entity to modify their respective listings to include the respective items or services on special.

As further illustrated in FIG. 1, the preferred location-based services system 10 is also capable of leveraging data that is preferentially grouped in four logical data groupings 52. These logical data groupings include profile data files 54, business data files 56, additional data files 58 and usage data files 60. The data files 54-60 contain detailed information on various items and services that are used by the location-based services system 10, which is set forth in detail below. The data files 54-60 can be located on the location-based application server 28, but are preferentially maintained on separate servers.

The profile data files 54 contain a group of logical entities that contain relevant information concerning each consumer of the location-based services system 10. These logical entities include, but are not specifically limited to the following items: consumer name; consumer phone number; consumer identification; consumer password; consumer home address; consumer home phone number; consumer email address; consumer pager number; consumer service subscriptions (detailing the consumers chosen level of participation in one or more services); consumer privacy preferences (detailing information denoting the willingness to share a consumers private data with others based on data type, requestor, service, etc.); consumer service preferences (detailing any specific saved information that is relevant to any of the services which a consumer may use, such as: named locations (such as the address for a consumers work location, or the address(es) of a consumers friend(s); named interests or preferences regarding hobbies, news topic interest, sports, music, preferred brands or chains, banking information and other demographic information. (such as NBA basketball, Jazz music, Italian food, favorite clothing brands or chains, banking information, etc.)); and preferred asynchronous communication method (such as email or pager) listed by service and/or service/content provider.

The business data files 56 are composed of a group of logical entities containing all relevant information regarding the businesses listed within the location-based services system 10, including but not limited to: business name; business phone number; business text description; business audio description; business video description; business and/or product images; business identification; business password; business category or categories; advertising participation level; advertising campaign information such as: parameters that define target market; campaign identification code; advertising content and special deals/discounts; saved data mining/reporting parameters; brands sold; brands serviced; product types sold; product types serviced; product models sold; product models serviced; product model prices; and service prices and inventory list (by brand, product type and product model).

The additional data files 58 contains a group of logical entities that generally includes any additional content that is capable of being leveraged by the location-based services system 10, possibly including, but not limited to: business ratings (via external evaluation services); weather conditions; driving directions; maps; traffic Although not specifically illustrated, the residential telephone number and address listings may be provided by local telephone companies through a residential listing server that is connected to the location-based application server 28.

The usage data files 60 contains a group of logical entities that generally includes all recorded information regarding consumer transactions from remote terminals 12, 40, possibly including, but not limited to: consumer identification (or a unique hash of consumer identification); date; time; service used; request type; search criteria; matched data purchases made, and actions taken. Those skilled in the art would recognize that several other types of usage data might be stored in the usage data files 60.

As generally set forth above, users of the location-based services system 10 are given the ability to search, via a remote terminal 12, 40, for a business that will satisfy specific purchase or service requirements using multiple access methods (voice, wireless application protocol or web application protocol). The location-based application server 28 is programmed to handle a variety of structured requests and is capable of generating a variety of structured responses in the same format (i.e.—voice, wireless application protocol or web application protocol) that the structured request was received by the location-based application server 28.

Some of the structured request parameters that are capable of being used for the business services provided by the location-based services system 10 include (but are not necessarily limited to) one or more of the following: product type; service type; business name; business category; product name (or model name); product brand; price level; business or service ratings (i.e. external evaluation from a rating service such as AAA); whether special deals are provided; location (auto-location (locating nearest ATM for instance), predefined locations, or consumer-specified locations); hours of operation; availability of service (for example: availability of a open table at a specified time at a restaurant); and company specified within favorites for a category (i.e., name of favorite coffee house franchise). Those skilled in the art would recognize that a variety of structured request parameters might be used in the present invention.

Optionally, consumers have the ability to "opt-in" to "push" content and advertising services. Push services are defined as services, which proactively deliver content to the consumer through the remote terminal 12, 40, rather than services delivered only following a request by the consumer. As set forth above, the preferences of the consumers that use the remote terminals 12 are stored within the profile data files 54. As such, by way of example only, a consumer that likes golf may be "pushed" an offering as they travel close to a nearby golf equipment store relating to a special offer on an item such as a golf club or particular brand of golf ball.

As set forth briefly above, the location-based services system 10 also gives businesses the ability to manage their respective content and mine usage data by using the advertiser portal web server 50. The advertiser portal web server 50 preferentially includes the following web-based applications: a campaign management application, a business profile management application, a mining/reporting and predictive modeling application. Each of these applications and their respective functional aspects is discussed in greater detail below.

The campaign management application includes several applications that allow a business to create advertising campaigns and an edit/delete advertising campaigns. The create campaign capability enables an advertiser to create a location-based advertising campaign. As part of this capability, the business would define the market segment at which the advertising is targeted. Then, the advertiser would define the advertising content that would be delivered to the target market, as well as the mechanism of delivery (i.e. pushed to each consumers remote terminal 12, 40, or presented only to a consumer when they make a relevant enhanced directory assistance request/search). The edit/delete campaign capability allows the business to modify or delete an existing campaign that has already been created and is running on the location-based application server 28.

The business profile management application includes a create business listing capability and an edit business listing capability. The create business listing capability enables a business to define their respective set of business data (see above for a list of content within the business data). The edit business listing capability allows the business to modify or delete their business listing. Those skilled in the art would recognize that several other options might be made available through the business profile management application.

The mining/reporting capability allows business to interface with data that is stored in the usage data files 60. An advertising effectiveness interface utilizes the usage data files 60 and business data files 56 to generate analysis surrounding the effectiveness of location-based advertising campaigns. The analysis will address questions such as "How many people received my campaign in the downtown area of Atlanta". The information provided to the businesses provides them insight to quantify the results of campaigns created in the location-based services system 10 through the campaign management tool.

The predictive modeling capability provides forecasting for potential customers likely to respond to offers, listings and deals. Examples of the type of feedback the consumer will receive include (but not limited to) the following: identifying customers likely to respond to their campaign by customer segment; identifying customers likely to request a campaign or listing by customer segment; and identifying demands by peak time or day.

As briefly set forth above, the location-based services system 10 provides a consumer using a remote terminal 12, 40 with access to products and services in a designated geographic area through multiple access methods such as voice, wireless application protocols (such as WAP and cHTML) and web protocols (such as Java and HTML). The present invention encompasses the full lifecycle of the location-based services system 10 including delivery and maintenance, which includes content management, consumer management, content delivery, advertising management, advertising reporting, advertising delivery, usage tracking, usage mining and reporting, billing and settlements.

The preferred location-based services system 10 is capable of providing location-based services to consumers through remote terminals 12, 40 and is managed by various content providers through the use of respective business remote terminals 46. The services that are provided through the location-based services system 10 preferentially includes an enhanced directory assistance service and an enhanced business service that is delivered through a voice recognition capability, wireless application protocol capability and/or web application capability.

In order to access the enhanced directory assistance services or the business services, the user of the remote terminal 12 preferentially enters a predetermined key sequence (e.g.— by pressing 411) on the keypad of the remote terminal 12 or by pressing a specially designed key on the remote terminal 12. If the remote terminal is not connected to the base station 16 already, when the enhanced directory assistance services or business services are selected, the remote terminal 12 establishes a connection with the base station 16 of the wireless communication system 14, which acts as a gateway to the location-based services system 10.

In another embodiment, in order to select one of the respective services, the user of the remote terminal 12 is given the option of using voice commands, but as previously set forth may also use keypad inputs on the remote terminal 12 to select the desired services as well. Those skilled in the art should recognize that the enhanced directory assistance services and the business services do not necessarily have to be provided through the same access method and that a keypad-based menu system may be used until the appropriate time occurs for the user to input a voice signal containing a request for information.

By way of example only, if the enhanced directory assistance services are selected by a user of the remote terminal 12, either the base station 16, the location-based application server 28 or remote terminal 12 can be programmed to generate a search parameter request that is audibly generated on the remote terminal 12. In the embodiment being discussed, the search parameter request is sent in the form of a voice signal that prompts the user to state the first and last name of the person they are looking for. In addition, the search parameter request could also include an option that might prompt to user to also state the geographic area where the person is located. As should be apparent from the discussion above, since the location-based services system 10 includes voice recognition applications, those skilled in the art should recognize that the entire process of entering the search parameter request may be done by voice signals generated on the remote terminals 12.

In response to the search parameter request that is generated on the remote terminal 12, the user preferentially provides a vocal response to the remote terminal that is transmitted to the base station 16. The vocal response preferentially includes a first name response and a last name response (and possibly a detailed geographic information response for non-local listings) of the particular person the user is looking to retrieve information on. The vocal response to the search parameter request, which preferentially also includes a unique remote terminal identifier that is associated with each respective remote terminal 12, is then sent from the remote terminal 12 to the base station 16. The base station 16 transmits the voice response to the PSTN 18, which then routes the vocal response, together with the remote terminal identifier, to the PBX 22.

The PBX 22 transmits the vocal response and the remote terminal identifier as inputs to voice recognition applications and natural language processing applications that are located on servers 24, 26, which in turn, respectively transform the vocal response and the remote terminal identifier into a structured residential listing request that is sent to the location-based application server 28. As set forth in detail above, the voice recognition applications analyze the vocal responses for the purposes of making a determination of the identity of particular words contained in the vocal responses. Any detailed geographic information provided by the user is also added to the structured residential listing request that is sent to the location-based application server 28.

Figure 2:
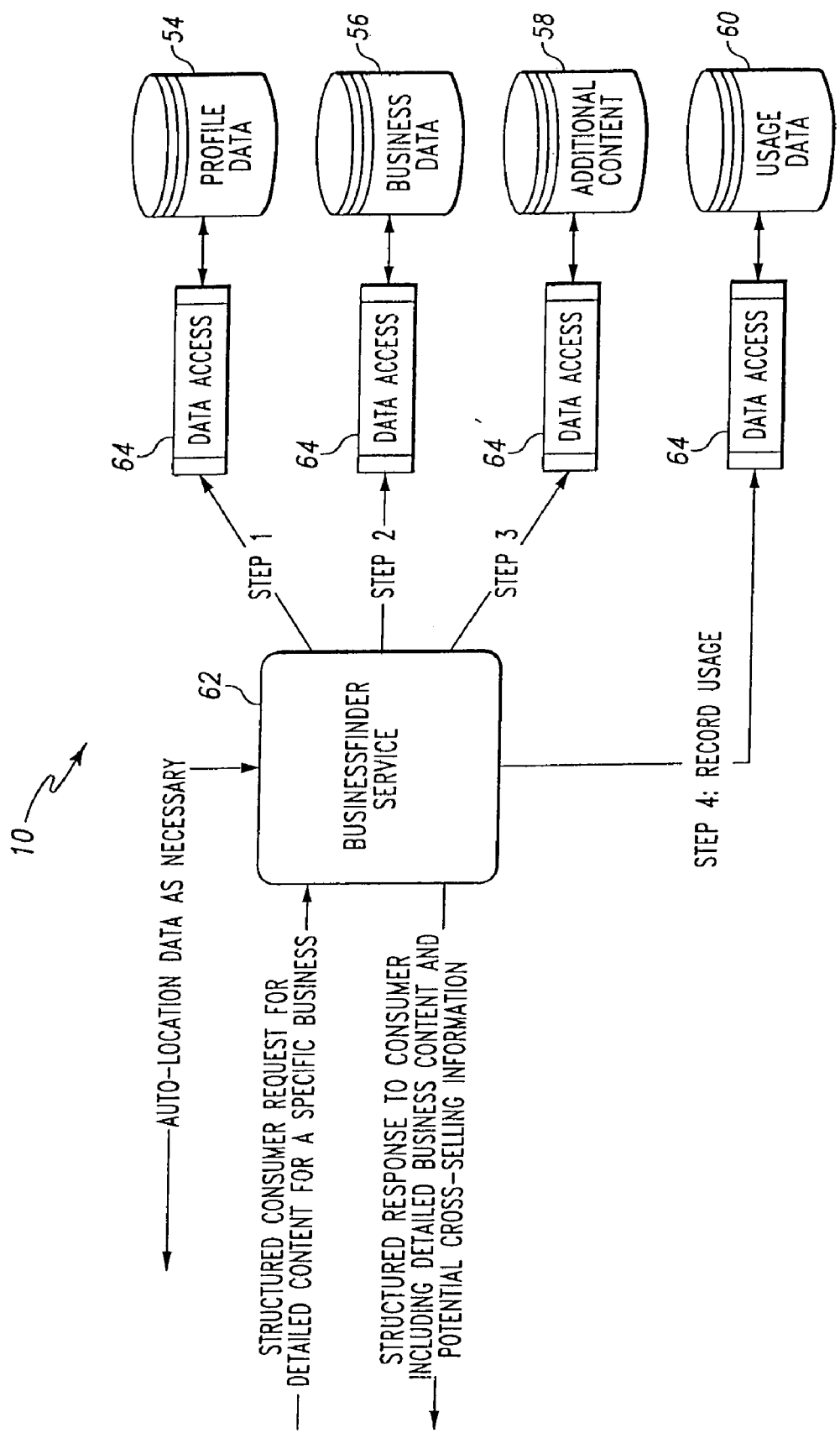
FIG. 2 is a flow chart illustrating the process steps performed by the location-based application server when processing structured requests.

As illustrated in FIG. 2, the structured residential listing request is used as an input to a residential finder application 62 located on the location-based application server 28. During operation, the residential finder application 62 interprets the structured residential listing request and uses at least one data access routine 64 to locate and retrieve the specific information requested by the structure residential listing request from a respective database file 54-58. Those skilled in the art should recognize that several database servers may be connected to the location-based application server 28 that are used to store various forms of information and content that is provided to users by the location-based services system 10 in varying types of formats, which will be set forth in greater detail below.

In the preferred embodiment of the present invention, the residential finder application 62 matches up the structured residential listing request with the geographic indicator of the remote terminal 12. If no geographic information is contained in the structured response, the residential finder application 62 conducts a search of the profile data files 54 and the additional data files 58 with data access routines 64 targeted within a predetermined area based on the geographic location of remote terminal 12. If geographic information is included in the vocal response, the residential finder application 62 conducts a search within the geographic area specified by the user. As set forth above, in the preferred embodiment of the present invention the residential listing database files are stored under the additional data files 58 by way of example only and should not be construed as a limitation of the present invention.

The residential finder application 62 preferentially also searches the profile data files 54 so that if the identity of the person contained in the structured residential request is identified as a subscriber of the location-based services system 10, a remote terminal 12 telephone number and/or an email address may also be added to the response that is provided to the user requesting the desired information. If the located person does turn out to be a subscriber of the location-based services system 10, other embodiments of the present invention allow the subscriber to create a personalized response that is stored in a database file and is provided in response to residential listing requests that identify them.

In addition to receiving the structured residential listing requests, the residential finder application 62 obtains a geographic indicator and a remote terminal identifier associated with the remote terminal 12. This allows the system to default to the geographic location of the remote terminal 12 to conduct the search, as set forth above. For instance, if the remote terminal 12 is located in Atlanta, Ga., the residential finder application 62 will know this from the geographic indicator and will only search listings in the Atlanta area.

Once the appropriate data is located by the residential finder application 62 that is responsive to the structured residential listing request, which in the present example would preferentially include at least one telephone number and/or the address of the person(s) named in the voice signal, the residential finder application 62 is operable to generate a structured residential response that is sent to voice synthesis server 33. As set forth in detail above, the voice synthesis server 33 is programmed to transform the structured residential response into a voice response signal with voice synthesis applications located on the voice synthesis server 33.

As set forth briefly above, the voice response that are generated by the voice synthesis server 33 can include the name, address, residential telephone number, mobile number and/or email address of the particular person for which the user has requested a residential listing. For those instances where the structured residential responses include more than one residential listing, the residential listing finder application 62 is preferentially programmed to generate a structured residential response that provides the multiple listing results in a predetermined organized listing arrangement.

The predetermined organized listing arrangement is preferentially set up so that the user of the remote terminal 12 is capable of interacting with the listings provided in the voice response through the use of a keypad input or by voice signals that are spoken into the remote terminal 12 by the user. Preferentially, the information is organized and presented to the user of the remote terminal 12 based on the address of the particular people identified by the residential finder application 62, however, those skilled in the art would recognize that other alternatives of presenting and organizing the results exist (i.e. -ranking the results in geographic order) are capable of being used in varying embodiments of the present invention.

If the person for whom information has been requested is designated as being unlisted or unavailable, the location-based application server 28 is preferentially programmed to generate a structured residential response that contains a message that indicates that the requested information is unlisted or unavailable. As such, in this particular embodiment of the present invention the location-based application server 28 sends the structured residential response to the voice synthesis server 33, which generates a voice signal that is sent to the remote terminal 12 informing the user that requested the residential listing that the requested residential listing it unlisted or unavailable.

As briefly set forth above, another preferred embodiment of the location-based services system 10 is capable of providing business services to the remote terminal 12, which are provided to the remote terminal 12 based on the geographic location of the remote terminal 12. If the user of the remote terminal 12 selects the business services option instead of the enhanced directory assistance services option, a variety of information services are capable of being delivered to the user through the location-based services system 10. During operation, the business services are provided to the remote terminal 12 through similar access methods that the residential listing services are provided to the remote terminal 12. In addition to being able to obtain the address and telephone number of local businesses, various other forms of business information is capable of being transmitted to the remote terminal 12 by the location-based services system 10.

As generally set forth above and in greater detail below, some of the preferred structured business request parameters that are capable of being processed by the business services of the location-based services system 10 include (but are not necessarily limited to) one or more of the following parameters: product/service types; business names; business category; product name (or model name); product brands; price level; business or service ratings (e.g.—external evaluation from a rating service such as AAA); whether special deals or offers are being provided; auto-location of predefined services (e.g.—locating the nearest ATM for instance); hours of operation; availability of service (e.g.—availability of a open table at a specified time at a restaurant); and/or business information specified within a user defined favorites category (e.g.—name of favorite coffee house franchise, favorite clothing brands, favorite restaurants).

In this preferred embodiment of the present invention, once a user of the remote terminal 12 gains access to the business services provided by the location-based services system 10, they are prompted by a voice signal requesting the user to state their respective business request. In response to the prompt for a business request, the user states a vocal response that is received by the remote terminal 12 that contains a predetermined request for a predetermined type of business content. The exact nature and content of the vocal response will vary, depending on the specific type of business/service information that is being requested by the user of the remote terminal 12. As set forth above and below, the preferred embodiment of the present invention includes natural language processing applications the are used to interpret the meaning and context of the words contained in the vocal response, thereby allowing the user of the remote terminal 12 to make a request using requests that are spoken using statements commonly used in everyday conversations.

By way of example only, let's say that a respective user of the remote terminal 12 wants to obtain business information related to determining the location of a favorite local fast-food restaurant. As such, the user's vocal response that is received by the remote terminal 12 might contain a voice signal that includes a request for business information that could be phrased something along the lines of the following statement: "What is the address of a Burger King restaurant that is close to my present location?" As previously set forth, this preferred embodiment of the present invention is capable of interpreting this request using natural language processing applications to generate a structured response.

As with the residential services, in this embodiment of the present invention the vocal response that is provided by the user of the remote terminal 12 is transmitted from the remote terminal 12 to the base station 16 of the wireless communication system 14, which in turn is operable to transmit the vocal response to the PSTN 18 that transmits the vocal response to the PBX 22. The vocal response is then sent from the PBX 22 to the voice recognition server 24 where it is processed with voice recognition applications to determine the identity or recognize the respective words that are contained in the vocal response from the user containing a business information request. Although not illustrated, in an alternative embodiment of the present invention the base station 16 is directly connected to the voice recognition server 24, thereby allowing the base station 16 to directly transmit vocal response to the voice recognition server 24.

After the words contained in the vocal response have been recognized using voice recognition applications, a respective output is generated by the voice recognition applications, which is used as an input to natural language processing applications. As set forth in detail above, the natural language processing applications determine the meaning and context of the words contained in the vocal response that is received by the remote terminal 12. Referring once again to FIG. 2, once the meaning and context of the recognized words contained in the vocal response have been determined, the natural language application is programmed to generate a structured business request that is sent to the location-based application server 28. The location-based application server 28 includes at least one business/services finder application 62 that is operable to process the structured business request by retrieving the requested information.

As set forth in detail above, the remote terminal 12 also sends a remote terminal identifier with the vocal response that is preferentially integrated in some manner with the structured business request that is ultimately generated and sent to the location-based application server 28. In addition, in this preferred embodiment of the present invention as well as others, a geographic indicator and a remote terminal identifier associated with the respective remote terminal 12 making the structured business request is also obtained or has already been obtained by the location-based application server 28. As illustrated in FIG. 2, the geographic indicator and the structured business request are used by the business/services finder application 62 to generate a structured business response that is responsive to the structured business request.

In our current example, the preferred business/services finder application 62 uses the geographic indicator of the remote terminal 12 to determine which particular Burger King location is closest to remote terminal 12. A mapping routine within the business/services finder application 62 compares the geographic location of the remote terminal 12 with the respective geographic locations of Burger King restaurants retrieved by the structured business request and makes the determination of which location is closest to the remote terminal 12, which can be based on the distance of the remote terminal 12 from each respective location. As illustrated in FIG. 2, this is accomplished by a data access routine 64 that accesses the appropriate information from the business data files 56, which preferentially contains a database of business listings, addresses, products and/or services provided.

After the appropriate information is located, the location-based application server 28 is programmed to generate a structured business response that is sent to the voice synthesis server 33. The voice synthesis server 33 converts the structured business response into a voice signal that is then sent to remote terminal 12. In this example, the structured business response would contain the address of the Burger King that is closest to remote terminal 12, which has been determined by the location-based application server 28 based on the geographic location of remote terminal 12.

In yet another example of this embodiment of the present invention, a user of the business services might request information on a retail store that sells a specific product or provides a specific service. For instance, a user might state: "Who sells or provides product/service (stating the particular product/service desired)?" After the voice recognition application and the natural language processing application interpret and transform the request into a structured business request, the business/services finder application 62 uses the geographic indicator of remote terminal 12 to narrow the structured business request to retrieve business information contained within a predefined geographic area in which the remote terminal 12 is located. If more than one business sells the item or provides the requested service, the business/services finder application 62 is programmed to generate a structured business response that is sent to voice synthesis server 33 containing a listing of the respective businesses meeting the desired criteria.

In yet another preferred embodiment of the present invention, the user is able to access the location-based services system 10 by using a wireless application protocol to generate and transmit structured requests to the location-based application server 28. A user of remote terminal 12 uses a keypad or some other equivalent input means to access the location-based services system 10 from a selection menu that is generated on a display of remote terminal 12. In this preferred embodiment of the present invention, once a user chooses to obtain access to the location-based services system 10, the remote terminal 12 is preferentially programmed to display a selection menu that contains a link to the business services and residential listing services provided by the location-based services system 10. Those skilled in the art would recognize that various predefined links and menu selections for various types of services may also be displayed that may or may not be specified by the user of remote terminal 12.

If the residential listing service is selected on the remote terminal 12, the user is prompted by remote terminal 12 to enter the first and last name of the person for which they desire to obtain information. By default, the remote terminal 12 is preferentially programmed to search for a listing that is contained in the immediate geographic location of the remote terminal 12. For example, if remote terminal 12 is located in the Atlanta metropolitan area, the search will be preset to be conducted using the Atlanta residential listings database. In alternative embodiments of the present invention, an additional input area is provided on the display of the remote terminal 12 whereby the user may designate the particular geographic location to search (i.e.—a city and state input location). As apparent, this allows the user to vary the location searched based on user preferences thereby providing further benefits to the user.

An additional item the remote terminal 12 is programmed to generate on the display is an icon or a selection area that is designated to cause the remote terminal 12 to transmit the search request, which contain the parameters that have been input by the user, to the base station 16 of the wireless communication system 14. As previously set forth, preferentially the search request is sent to the base station 16 using a wireless application protocol, which for the purpose of the present invention should be broadly construed to include a broad range of standards used by various wireless communication systems 14. The remote terminal 12 also transmits a remote terminal identifier with the search request, which as previously set forth, is assigned to remote terminals 12 for identification purposes. Once received by the base station 16, the search request is directed to the WAP gateway 34, which in turn, is preferentially programmed to transmit all search requests that are received by users accessing the location-based services system 10 to the WAP server 38.

The WAP server 38 is programmed to interpret the search request and generate a structured residential request that is sent to the location-based application server 28. For identification purposes, the remote terminal identifier is also transmitted to the location-based application server 28 with the structured residential request. As with other embodiments of the present invention, the location-based application server 28 is programmed with a residential finder application 62 that uses one of several data access routines 64 to obtain the requested information from a respective database file 54-58.

A structured response is then sent to the WAP server 38, which in turn transmits the structured response to the WAP gateway 34 and ultimately on to the remote terminal 12.

If the business services option is selected, the remote terminal 12 prompts the user for a search request, which the user enters on the remote terminal 12. The search request is then sent to the location-based application server 28, in a similar fashion as described with the directory assistance services, where it is processed by a business/services finder application 62. The business/services finder application 62 uses data access routines 64 to retrieve the desired information and generates a structured response that is based on the geographic location of the remote terminal 12.

For example, if the remote terminal 12 is located on the upper north side of Atlanta, Ga., the location-based application server 28 will be informed of this fact by receiving a geographic indicator from the second remote terminal 12 and will be operable to generate structured responses to structured requests that contain information that is targeted for that particular geographic location. For instance, if a user of the remote terminal 12 enters a search request for information on "Chinese restaurants running specials", a structured response is generated by the business/services finder application 62 that provides information about Chinese restaurants on the upper north side of Atlanta, and not Chinese restaurants located in irrelevant geographic locations, such as the far south side of Atlanta.

As previously set forth, in yet another preferred embodiment of the location-based services system 10 a user of the second remote terminal 40 is connected to a subscriber web portal server 44. The second remote terminal 40 and the subscriber web portal server 44 are designed to communicate with each other using standard web-based protocols (e.g.— HTML). The subscriber web portal server 44 is connected to the location-based application server 28, thereby providing the second remote terminal 40 with access to the business services and enhanced directory assistance services that are offered in the preferred embodiments of the present invention.

The second remote terminal 40 is capable of providing voice or keypad input data to the subscriber web portal server 44. As previously set forth, for voice signals the respective vocal responses are sent to the voice recognition servers 24 for processing and, in the case of keypad input data, the subscriber portal web server 44 is operable to generate structured requests in response to user requests received from the second remote terminal 40 in similar manners as set forth above. The preferred location-based services system 10 is capable of allowing its subscribers to take advantage of the services provided by the present invention in a non-wireless environment as well, by supporting the use of standard computing devices that are typically used at home or work.

As such, by way of example only, let's say a user of the second remote terminal 40 is located in Atlanta, Ga., and wants to find local deals on Polo merchandise as well as stores that carry this particular brand that are located near their respective geographic location. In the case of a keypad input search, the user would be prompted for a search request from a web page generated on the second remote terminal 40 where they would enter their desired search parameters, which in the present example might be in the form of the words "POLO MERCHANDISE".

After the search request is entered and the user is ready to send the request, there is also preferentially an icon or some other type of selection indicator that is generated on a web page being displayed on the second remote terminal 40 that allows the user to submit the request. Once this is selected, the search request, a second remote terminal identifier and a geographic indicator are sent to the subscriber web portal server 44. The subscriber web portal server 44 then transforms the search request into a structured search request that is sent to the location-based application server 28, which processes the structured request similar to other embodiments of the present invention.

In the case of a voice signal input being used, the user would be prompted to state their respective request much like in the example set forth above with relation to wireless remote terminal 12. As such, in the case of our present example, the user would state "POLO MERCHANDISE" after being prompted for a business services request. This vocal response is sent to the voice recognition server 24, which as previously set forth, processes the vocal response similar to other embodiments herein described.

As such, in our present example, a user of the second remote terminal 40 would be provided with a structured response from the location-based application server 28 that contained information relating to businesses that sell Polo merchandise in a geographic location that is relatively close to the second remote terminal 40. In fact, in every embodiment of the present invention, the user may also be given option of selecting a predetermined geographic radius for which they wish responses to be generated during operation. By way of example only, a respective user may only desire to obtain information on businesses located within 15 miles of the remote terminals 12, 40 and as such, may set a setting provided on the remote terminal 12, 40 that only allows responses to business services requests to be generated within a 15 mile radius of the remote terminal 12, 40.

Referring once again to FIG. 1, a wireless carrier 70 may also be connected to the data files 54-60 through a wireless carrier server 72. The wireless carrier server 72 is preferentially operable to monitor the data that is contained in the data files 54-60. As such, during operation of the location-based services system 10 the wireless carrier server 72 can update a subscriber data file 74 as users of the remote terminals 12, 40 access the location-based services system 10. This allows the wireless carrier 70 to keep track of the usage of the location-based services system 10 and may allow various charges to be applied to the user if applicable.

Figure 3:
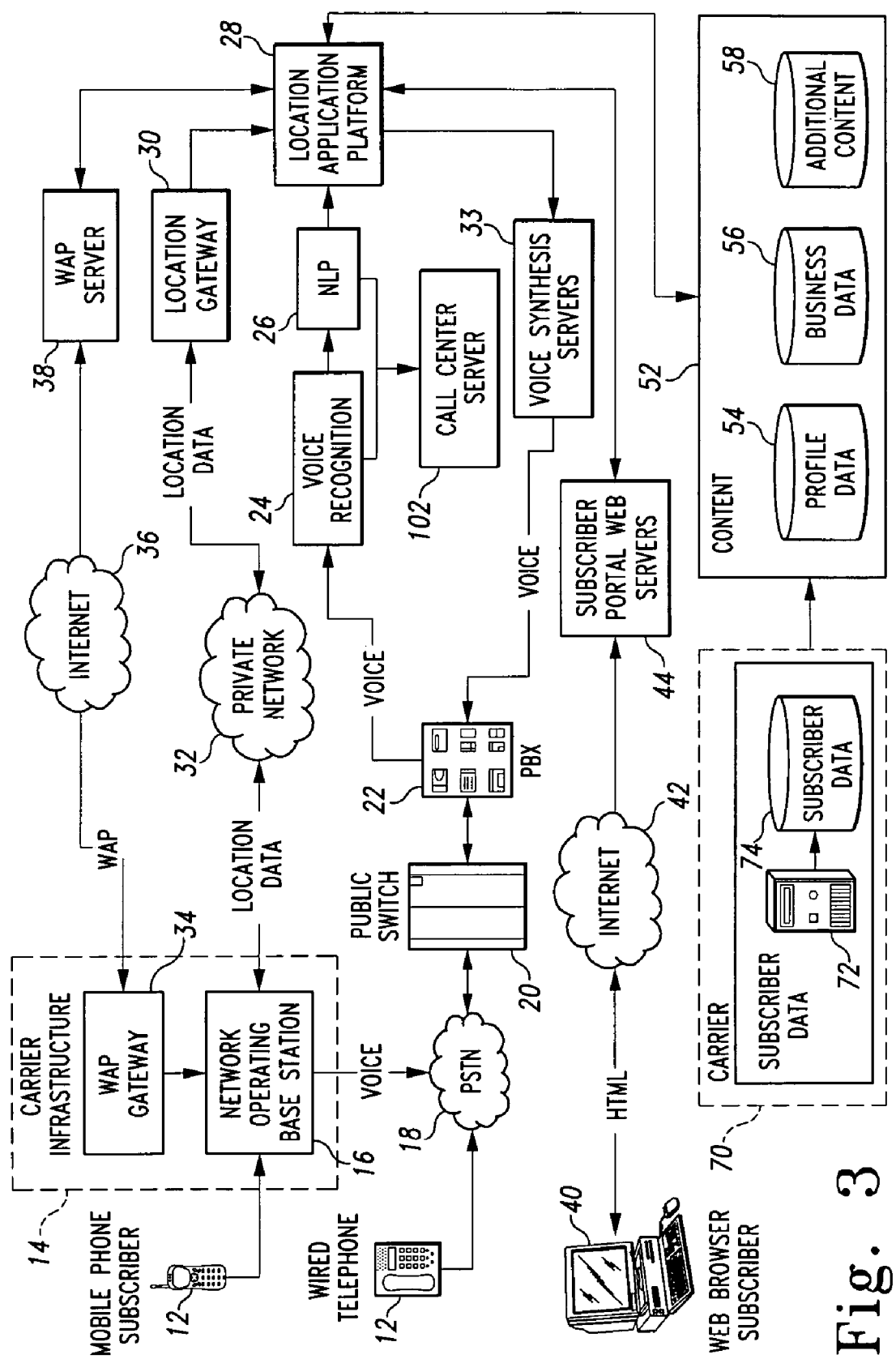
FIG. 3 illustrates a preferred embodiment of the location-based services system with a system for determining and routing call failures.
Figure 4:
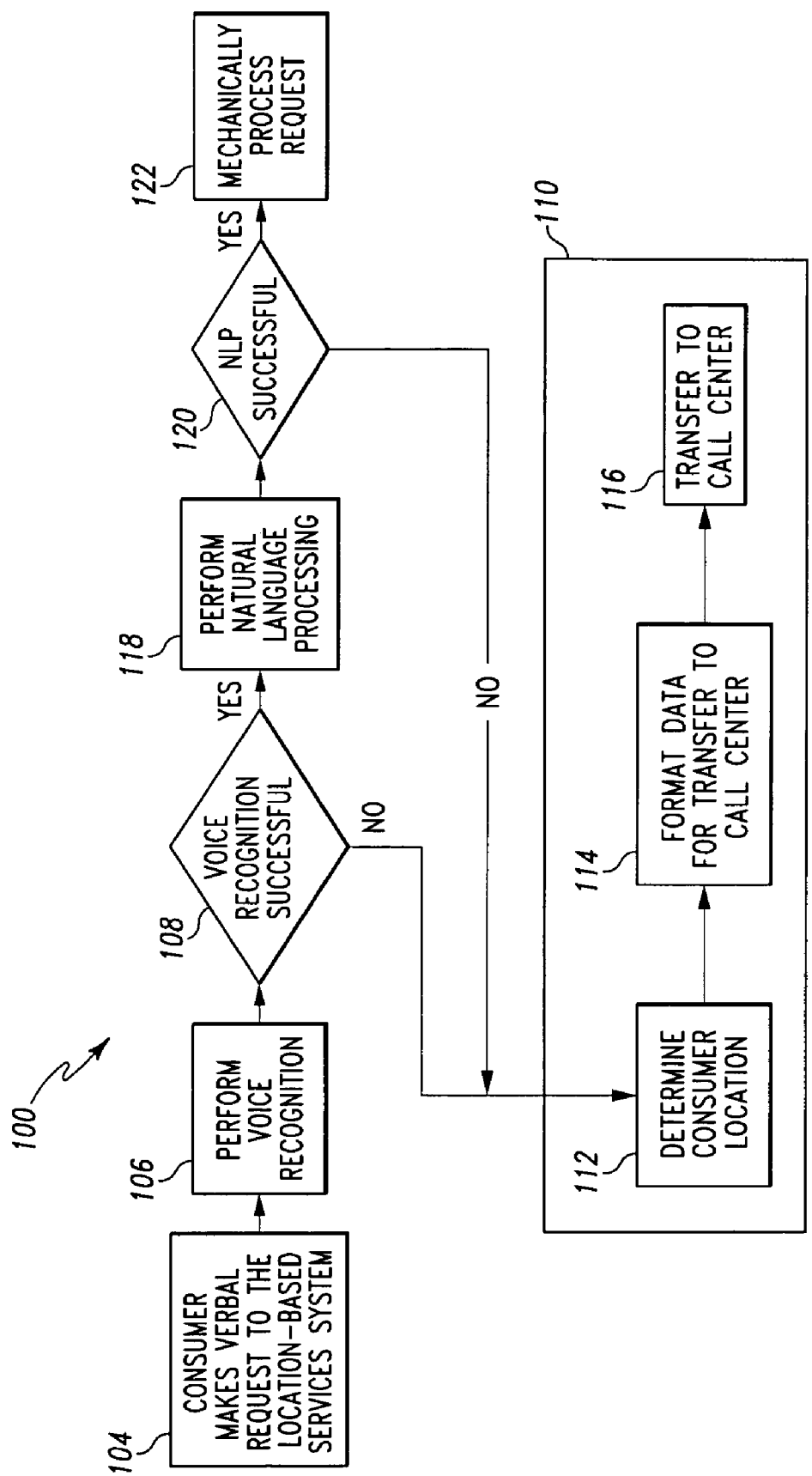
FIG. 4 illustrates the preferred method steps performed to determine and route call failures in the location-based services system.

Referring to FIGS. 3 and 4, another aspect of the present invention discloses a call failure system 100 that routes call failures to an operator in a location-based services system 10. The call failure system 100 is preferentially located on a call center server 102 that is connected to the voice recognition server 24 and the natural language processing server 28. During operation consumers input structured requests into the location-based services system 10 using one of three access methods: via a voice access method (wireless or wire line), a wireless application protocol such as WAP, or web application protocol such as HTML (or any other suitable markup language). As set forth in greater detail above, the means by which user requests are transmitted to respective service handlers is based upon the chosen access method.

For a voice access method, consumers initiate a voice call from the remote terminal 12, 40 that preferentially may be selected from a wireless communication device, a remote computer terminal and a regular telephone. If the voice call is initiated from a wireless remote terminal 12, the voice call is routed to the PBX 22 from the wireless communication system 14. The manner in which the other access methods set forth above route voice calls for processing will vary depending upon the particular type of access method used in the location-based services system 10.

Consumers access the location-based services system 10 and when prompted provide a structured request for information about a particular product. Preferentially, the structured request is entered by the consumer using natural language, which means the type of language that is used during the normal course of speaking and not broken or parsed versions of respective languages. Although a wireless remote terminal 12 is discussed in the sections that follow, various voice-based communication devices could be used to provide structured requests to the location-based services system 10. Structured requests are requests for information about a particular product that contain voice signals that can be used by the location-based services system 10.

In the preferred embodiment, once the structured request reaches the PBX 22 it is forwarded to the voice recognition server 24 for signal digitization and voice recognition by a voice recognition application. Next, the words chosen as the highest probable match for the words contained in each respective voice signal are passed to the natural language processing server 26. The natural language processing server 26 assesses the holistic validity of the chosen words in the voice signals and interprets the likely context and meaning from the words. It then identifies the application services required to fulfill the request, generates a structured search request containing the necessary message (as required by the appropriate application service) and passes this message or structured search request to the location-based application server 28.

As set forth in FIG. 3, the natural language processing server 26 is connected to the location-based application server 28. As set forth in detail above, the location-based application server 28 is programmed or operable to provide responsive information to the remote terminals 12, 40 that has been requested by a respective user of the remote terminal 12, 40. Generally speaking, the location-based application server 28 is used to retrieve and pass on location-based information to the remote terminals 12, 40 using various types of data formats. The type of information provided to the remote terminals 12, 40 varies depending on the specific nature of the information that has been requested from the user and the geographic location of the remote terminal 12, 40.

During operation, after the meaning of the words in the voice signals are interpreted, the natural language processing server 26 is programmed or operable to create a structured request that is sent to the location-based application server 28 requesting information that depends on the consumer's request. In response to the structured request from the natural language processing server 26, the location-based application server 28 generates a structured response that is sent to the remote terminal 12, 40. The exact nature or contents of the information sent in the structured response that is generated by the location-based application server 28 depends on the specific details of the tailored request for information that is made by a particular user of the remote terminal 12, 40.

When either the voice recognition server 24 or the natural language processing server 26 fail to successfully process the voice input provided by the consumer with the remote terminal 12, 40, the voice call is forwarded to the call failure system 100 for completion as shown in FIG. 3. The call failure system 100 preferentially connects the user to an operator who can assist the consumer locate listings or offers for the particular product or services that they are looking for since either the voice recognition server 24 or the natural language processing server 26 failed to properly process the structured request. The operator can also assist the consumer complete transactions over the location-based services system 10 as well.

Referring to FIG. 4, a more detailed description of the steps performed by the call failure system 100 to route and handle call failures in the location-based services system 10 will be described below. At first, a consumer enters their verbal request into the remote terminal 12, 40 at step 104. Next, at step 106 the voice input is digitized and processed by the voice recognition server 24. At step 108, if the voice recognition server 24 fails to recognize the words contained in the voice signal that is input by the user to a specified level of accuracy, then the location-based services system 10 takes steps to ensure that the request is properly processed by forwarding the request to a request failure application 110.

As illustrated, the request failure application 110 first determines the location of the user of the remote terminal 12, 40 by generating a location data request that is based upon a remote terminal identifier (such as the remote terminal phone number for example) at step 112. For wireless remote terminals 12 can use location gateway applications to generate the location data. Other access methods can use other methods of determining the location of the user such as, for example, a user of remote terminal 40 can have a setting that indicates the location of the remote terminal 40. In the case of a regular telephone, caller id mechanisms could be used to determine the geographic location of the user.

Once the location data request is generated it is sent to the location gateway 30 of the wireless communication system 14. In response to the location data request, the wireless communication system 14 generates a location response that is sent to the request failure application 110. Once the request failure application 110 receives the location data it is parsed if necessary and the location value is extracted. Once the location of the user is determined an operator message is created that includes (but is not limited to) the caller phone number and their location information at step 114. The user is also preferentially notified that their call is being processed via a synthesized or recorded message that can be generated and sent to the user from the voice synthesis server 33. The operator message and the call is then forwarded by the call failure system 100 to the operator call routing system or call center for completion at step 116.

If the voice recognition server 24 successfully recognizes the voice input to a specified level of confidence, then the phonemes and/or words that were identified by the voice recognition server 24 are transmitted to the natural language processing server 26 at step 118. The natural language processing server 26 is used to determine the context and intent of the consumer's request. If the natural language processing server 26 fails to recognize the context or intent of the consumer's request to a specified level of confidence, then the request is forwarded to the request failure application 110, which is illustrated at step 120. If the natural language processing application 26 determines the context or intent of the speech to a specified level of confidence or accuracy, then the location-based application server 28 processes the request for information and a response is generated and sent to the user, which is illustrated at step 122.

If the natural language processing application 26 indicates that it cannot determine the context or intent of the user's request with a high enough degree of accuracy, as with failures related to the voice recognition server 24, the request failure application 110 first determines the location of the user of the remote terminal 12, 40. This is accomplished by generating a location data request that is based upon a remote terminal identifier (such as the remote terminal phone number for example) at step 112. For wireless remote terminals 12 can use location gateway applications to generate the location data. Other access methods can use other means of determining the location of the user such as, for example, a user of remote terminal 40 can have a setting that indicates the location of the remote terminal 40. In the case of a regular telephone, caller id mechanisms could be used to determine the geographic location of the user.

Once the location data request is generated it is sent to the location gateway 30 of the wireless communication system 14. In response to the location data request, the wireless communication system 14 generates a location response that is sent to the request failure application 110. Once the request failure application 110 receives the location data it is parsed if necessary and the location value is extracted. Once the location of the user is determined an operator message is created that preferentially includes (but is not limited to) the caller phone number and their location information at step 114. The user is also preferentially notified that their call is being processed via a synthesized or recorded message that can be generated and sent to the user from the voice synthesis server 33. The operator message and the call is then forwarded by the request failure application 110 to the operator call routing system or call center for completion at step 116.

As generally set forth above, if the natural language processing server 26 successfully recognizes the context and intent of the user's request to a specified level of confidence, then the necessary application service(s) are identified to satisfy the user's request. The appropriate response is created by the location-based application server 28 and the resulting information is provided back to the consumer via a synthesized voice message.

While the invention has been described in its currently best-known modes of operation and embodiments, other modes, embodiments and advantages of the present invention will be apparent to those skilled in the art and are contemplated herein.

What is claimed is:

1. A method for routing call failures, comprising the steps of:
   connecting a remote terminal to a location-based services system;
   receiving from said remote terminal an identifier of said remote terminal and an unrestricted voice-based inquiry for information, wherein said voice-based inquiry is a question or statement for a business product or a business service, said voice-based inquiry is voluntarily composed by a user of said remote terminal;
   determining a geographic location of said remote terminal;
   recognizing words included in said voice-based inquiry with a voice recognition application;
   interpreting a context and meaning of said recognized words in said voice-based inquiry with a natural language processing application;
   with said natural language processing application, identifying from among a plurality of businesses listed within said location-based services system, a business that can provide a response to said the voice-based inquiry for said business product or said business service based on said interpretation of said recognized words and said geographic location of said remote terminal, and preparing a structured request to said identified business in response to both said voice recognition application and said natural language processing application successfully processing said voice-based inquiry;
   from business specific information of said identified business, generating with said location-based services system, for receipt by said remote terminal, a geographically targeted response to said voice-based inquiry that is responsive to said interpretation; and
   in response to failure of said voice recognition application or said natural language processing application to process said voice-based inquiry to a predetermined level of accuracy, routing said remote terminal connection and said identifier to a call center server to process said voice-based inquiry;
   said call center server generating a location data request that is transmitted to a location server with said identifier;
   receiving a location value and said identifier from said location server with said call center server;
   said call center server generating an operator message that includes said identifier and said location value; and
   forwarding said operator message to a call center.

2. The method of claim 1, further comprising the step of connecting an operator to said remote terminal to assist a user of said remote terminal by entry into a location-based application server of a request for information from said user.

3. The method of claim 2, further comprising the step of generating a structured response to said request for information with said location-based application server.

4. The method of claim 3, further comprising the step of transmitting said structured response to said remote terminal.

5. The method of claim 3, further comprising the step of transmitting said structured response to a voice synthesis server that is operable to create a voice response that is sent to said remote terminal.

6. The method of claim 1, further comprising the step of generating a message notifying a user of said remote terminal that an operator is being connected to said remote terminal.

7. The method of claim 1, wherein determining a geographic location of said remote terminal comprises accessing a desired geographic location set by said user of said remote terminal.

8. A call failure system for a location-based services system, comprising:
   a remote terminal connected to said location-based services system, wherein said remote terminal is useable to generate a user fashioned voice based statement or question that is a request for information related to a business product or a business service;
   a location gateway adapted to determine a geographic location of said remote terminal and provide a geographic indicator representative of said geographic location of said remote terminal;
   a voice recognition application configured to be connected to said remote terminal, said voice recognition application adapted to recognize words in said user fashioned voice based statement or question received from said remote terminal;
   a natural language processing application in communication with said voice recognition application, said natural language processing application configured to interpret a context and intent of said recognized words and generate a corresponding structured request for business services in the form of a message required by an identified one of a plurality of business services, said corresponding structured request generated in response to both said voice recognition application and said natural language processing application successfully processing said user fashioned voice based statement or question, wherein said one of said plurality of business services is identified by said natural language processing application as being capable of providing a response to said user fashioned voice based statement or question; and a call center server connected to said location-based services system, wherein said connection to said remote terminal is routable to said call center server in response to failure of said voice recognition application or said natural language processor to process said user fashioned voice based statement or question to a predetermined level of accuracy, said call center server being configured to request and receive said geographic indicator from said location gateway, and provide a geographically targeted response to said remote terminal based on said user fashioned voice based statement or question and said geographic indicator.

9. The call failure system for a location-based services system of claim 8, wherein an operator connected to said call center server assists a user of said remote terminal by entering a request for information into a location-based application server.

10. The call failure system for a location-based services system of claim 9, wherein said location-based application server generates a structured response to said request for information.

11. The call failure system for a location-based services system of claim 10, wherein said structured response is transmitted to said remote terminal.

12. The call failure system for a location-based services system of claim 10, wherein said structured response is sent to a voice synthesis server that is operable to create a voice response that is sent to said remote terminal.

13. The call failure system for a location-based services system of claim 8, wherein a message is generated that is to be transmitted to said remote terminal to notify said user of said remote terminal that an operator is being connected to said remote terminal.

14. The call failure system for a location-based services system of claim 8, wherein said remote terminal is configured with an enhanced directory assistance service and an enhanced business service that are selectable by said user, and said user fashioned voice based statement or question is a request for information generated after selection of a service.

15. The call failure system for location-based services system of claim 8, further comprising a location-based application server configured to receive said structured request and generate a structured response that is responsive to the structured request.

16. The call failure system for location-based services system of claim 8, wherein the structured request is a request for information about a particular product.

17. The call failure system for a location-based services system of claim 8, wherein said call center server is configured to generate and transmit a request that includes an identifier of said remote terminal to said location gateway, and said location gateway, in response to said request, is configured to provide said geographic indicator to said call center server based on said identifier.

18. The call failure system for a location-based services system of claim 17, wherein said call center server is configured to forward said identifier and said geographic indicator to a call center to enable an operator to provide said geographically targeted response to said remote terminal based on said user fashioned voice based statement or question and said geographic indicator.

19. A method for routing call failures, comprising the steps of;
receiving a voice-based request from a remote terminal connected to a location-based services system, wherein the voice-based request is an open-ended, non-predefined question or statement that includes a terminal identifier of the remote terminal;
identifying particular words included in the voice-based request with a voice recognition application;
interpreting a meaning of the identified particular words with a natural language processing application, the natural language processing application identifying an application service that can provide a response to the voice-based request, and preparing a structured request to the identified application service with the natural language processing application in response to both the voice recognition application and the natural language processing application successfully processing the voice-based request;
forwarding the voice-based request and the terminal identifier to a call failure system in response to failure of either the voice recognition application or the natural language processing application to successfully process the voice-based request;
in response to receipt of the forwarded voice-based request, with the call failure system transmitting to a location gateway a location data request based upon the terminal identifier;
the call failure system receiving from the location gateway in response to the location data request, location data indicative of a location of the remote terminal and the terminal identifier; and
the call failure system, forwarding an operator message that includes the voice-based request, the terminal identifier and the location data to a call center.

20. The method of claim 19, further comprising the initial step of receiving from the remote terminal a selection of one of business services or directory services, and in response to selection of business services, the voice-based request is a request for information on a business that will satisfy a specific geographically based purchase or service requirement described in the voice-based request.

21. The method of claim 20, further comprising transmitting the structured request to the location-based application server, the location-based application server operable to request and receive, from a location gateway, geographic location data of the remote terminal based on the terminal identifier included with the voice-based request.

22. The method of claim 21, further comprising the step of generating a structured geographically targeted response with the application service in accordance with the geographic location data and the structured request.

23. The method of claim 22, further comprising the step of transmitting the structured geographically targeted response to the remote terminal.

24. The method of claim 19, wherein forwarding an operator message comprises the step of connecting an operator to the remote terminal to assist a user of the remote terminal by manually entering the voice-based request into the location-based application server.

25. The method of claim 19, wherein forwarding an operator message comprises transmitting a geographically targeted structured response that is generated in response to the operator message for receipt by the remote terminal.

26. The method of claim 25, further comprising the step of transmitting the geographically targeted structured response to a voice synthesis server that is operable to create a voice response that is transmittable to the remote terminal.

27. The method of claim 19, further comprising the step of generating a verbal message notifying a user of the remote terminal that an operator is being connected to the remote terminal.

28. A call failure system for a location-based services system, comprising:
- a voice recognition server operable to receive from a remote mobile terminal over a wireless network a voice-based request for information that is an unconstrained, natural language question or statement, said voice recognition server further operable to identify specific words in said voice-based request;
- a natural language processing server in communication with said voice recognition application, said natural language processing server operable to determine an intent of said voice-based request based on said identified specific words, and identify an application service that can provide a response to said voice-based request, said natural language processing server further operable to generate a structured request message capable of being processed with said identified application service in response to both said voice recognition application and said natural language processing application successfully processing said voice-based request
- a location based server in communication with said natural language processing server, said location based server operable to request and receive a geographic indicator of a geographic location of said remote mobile terminal in response to receipt of said structured request message, said location based server further operable to generate a geographically tailored structured response to said structured request based on said received geographic indicator, said structured response receivable by said remote mobile terminal;
- a location gateway server configured to receive and store said geographic indicator, wherein said geographic indicator is transmittable from said location gateway server to said location-based server only when said location-based server has received a structured request; and
- a call center server in communication with said voice recognition server and said natural language processing server, wherein, in response to said voice-based request not successfully being processed by said voice recognition server or said natural language processing server, said voice-based request forwarded to said call center server,
- said call center server operable to request and receive said geographic indicator, and generate an operator message that includes said voice-based request and said geographic indicator, said operator message useable by an operator to assist in generation of a structured response to said voice-based request.

29. The call failure system for a location-based services system of claim 28, wherein said call center server comprises a request failure system and an operator call routing system, wherein said request failure system is operable to retrieve a location of said remote mobile terminal from said location gateway server in response to receipt of said voice-based request.

30. The call failure system for a location-based services system of claim 28, wherein said call center server is configured to generate and transmit a request that includes an identifier of said remote mobile terminal to said location gateway server, and said location gateway server, in response to said request, is configured to provide said geographic indicator to said call center server based on said identifier.

31. The call failure system for a location-based services system of claim 30, wherein said call center server is configured to forward said identifier and said geographic indicator to a call center to enable an operator to provide a geographically targeted response to said remote terminal based on said voice-based request for information and said geographic indicator.

* * * * *

UNITED STATES PATENT AND TRADEMARK OFFICE
CERTIFICATE OF CORRECTION

PATENT NO. : 7,412,260 B2 Page 1 of 1
APPLICATION NO. : 10/133118
DATED : August 12, 2008
INVENTOR(S) : Michael L. Gailey et al.

It is certified that error appears in the above-identified patent and that said Letters Patent is hereby corrected as shown below:

Column 14
Line 34, delete "the" and insert --that-- between "applications" and "are".

Column 21
Line 55, delete "the" after "said" and before "voice-based".

Column 24
Line 38, delete "20" and insert --19--.

Signed and Sealed this

Twenty-first Day of October, 2008

JON W. DUDAS
*Director of the United States Patent and Trademark Office*